US006695739B2

(12) United States Patent
Fett

(10) Patent No.: US 6,695,739 B2
(45) Date of Patent: Feb. 24, 2004

(54) ULTRA NARROW ADJUSTABLE DIFFERENTIAL ASSEMBLY

(75) Inventor: Gregory Allen Fett, Fort Wayne, IN (US)

(73) Assignee: Torque-Traction Technologies, Inc., Holland, OH (US)

(*) Notice: Subject to any disclaimer, the term of this patent is extended or adjusted under 35 U.S.C. 154(b) by 0 days.

(21) Appl. No.: 10/178,574

(22) Filed: Jun. 25, 2002

(65) Prior Publication Data

US 2003/0236147 A1 Dec. 25, 2003

(51) Int. Cl.$^7$ ............................................... F16H 48/06
(52) U.S. Cl. ....................................................... 475/230
(58) Field of Search ........................................ 475/230

(56) References Cited

U.S. PATENT DOCUMENTS

| | | | | |
|---|---|---|---|---|
| 1,123,582 A | * | 1/1915 | Patch ........................... | 475/230 |
| 1,158,439 A | * | 11/1915 | Bunting ........................ | 475/230 |
| 1,421,834 A | * | 7/1922 | Ross ............................. | 475/230 |
| 1,440,555 A | * | 1/1923 | Ross ............................. | 475/230 |
| 1,854,036 A | * | 4/1932 | Jaegerhuber ................. | 475/230 |
| 5,098,355 A | * | 3/1992 | Long ............................ | 475/230 |

* cited by examiner

*Primary Examiner*—Dirk Wright
(74) *Attorney, Agent, or Firm*—Liniak, Berenato & White

(57) ABSTRACT

An ultra narrow adjustable differential assembly includes a ring gear rotatably supported within a differential housing about a central axis, a set of differential pinion mate gears rotatably mounted to the ring gear, a pair of opposite side gears drivingly engaging the differential pinion mate gears for establishing driving connection between the ring gear and the side gears and allowing differential rotation between the side gears, and an adjustment device for selectively adjusting position of the ring gear relative to the differential housing and proper bearing preload.

20 Claims, 5 Drawing Sheets

ULTRA NARROW ADJUSTABLE DIFFERENTIAL ASSEMBLY

BACKGROUND OF THE INVENTION

1. Field of the Invention

The present invention relates to differential assemblies, and more particularly to a ultra narrow differential assembly for motor vehicles having a device for adjusting position of a ring gear relative to an axle housing and bearing preload.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Conventional differentials include a differential case defining a gear chamber, and disposed therein, a differential gear set including at least one input pinion gear, and a pair of output side gears non-rotatably coupled to corresponding axle shafts. Such a device essentially distributes the torque provided by the input shaft between the output shafts. This type of differentials is known in the art as an open differential, i.e. a differential where movements of its various internal components are not restricted in any significant fashion.

Normally, the differential assemblies comprise a differential case and a differential pinion shaft is disposed within the differential case for rotatably supporting a set of pinion mate gears. In turn, the pinion mate gears drivingly engage a pair of opposite side gears for allowing differential rotation therebetween. Typically, the side gears are splined to corresponding axle shafts.

The conventional differential assemblies are multipart and relatively voluminous aggregates, expensive in manufacturing and labor extensive in assembling.

Thus, there is a need for a differential assembly that is simple, compact and inexpensive to manufacture.

SUMMARY OF THE INVENTION

The present invention provides a novel arrangement of an ultra narrow differential assembly comprising a differential housing, a ring gear rotatably supported within the differential housing about a central axis, a set of differential pinion mate gears rotatably mounted to the ring gear, a pair of opposite side gears drivingly engaging the differential pinion mate gears for establishing driving connection between the ring gear and the side gears and allowing differential rotation between the side gears, and an adjustment device for selectively adjusting position of the ring gear relative to the differential housing.

Preferably, the adjustment device includes a pair of adjustment members selectively positionable within the differential housing coaxially to the central axis on opposite sides of the ring gear. The adjustment members have a substantially cylindrical threaded outer peripheral surfaces engaging with corresponding internally threaded bores provided in the differential housing for selectively axially positioning the adjustment members therewithin.

The differential pinion mate gears are rotatably mounted in complementary recesses in a central bore of the ring gear in a free-floating manner.

The differential assembly of the present invention further comprises a pair of ball bearing assemblies each disposed between one of face surfaces of the ring gear and one of the adjustment members for rotatably supporting the ring gear within the differential housing. Preferably, each of the bearing assemblies includes an inner race integrally formed on one of the face surfaces of the ring gear, an outer race integrally formed on an inner face surface of the adjusting ring, and a plurality of spherical rolling elements.

In accordance with the first exemplary embodiment of the present invention, each of the adjustment members has a radially inwardly protruding retaining flange provided for limiting axial outward movement of the corresponding side gear, and a pair of thrust bearings is provided each disposed between one of the side gears and the retaining flange of the corresponding adjusting members.

Alternatively, in accordance with the second exemplary embodiment of the present invention, the differential assembly comprises a pair of opposite radially inwardly protruding retaining rings fitted within complementary annular recesses formed on the substantially cylindrical central bore of the ring gear for limiting axial outward movement of the side gears.

Therefore, the novel differential assembly in accordance with the present invention provides a simple, ultra narrow, inexpensive in manufacturing and easy to assemble differential assembly.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
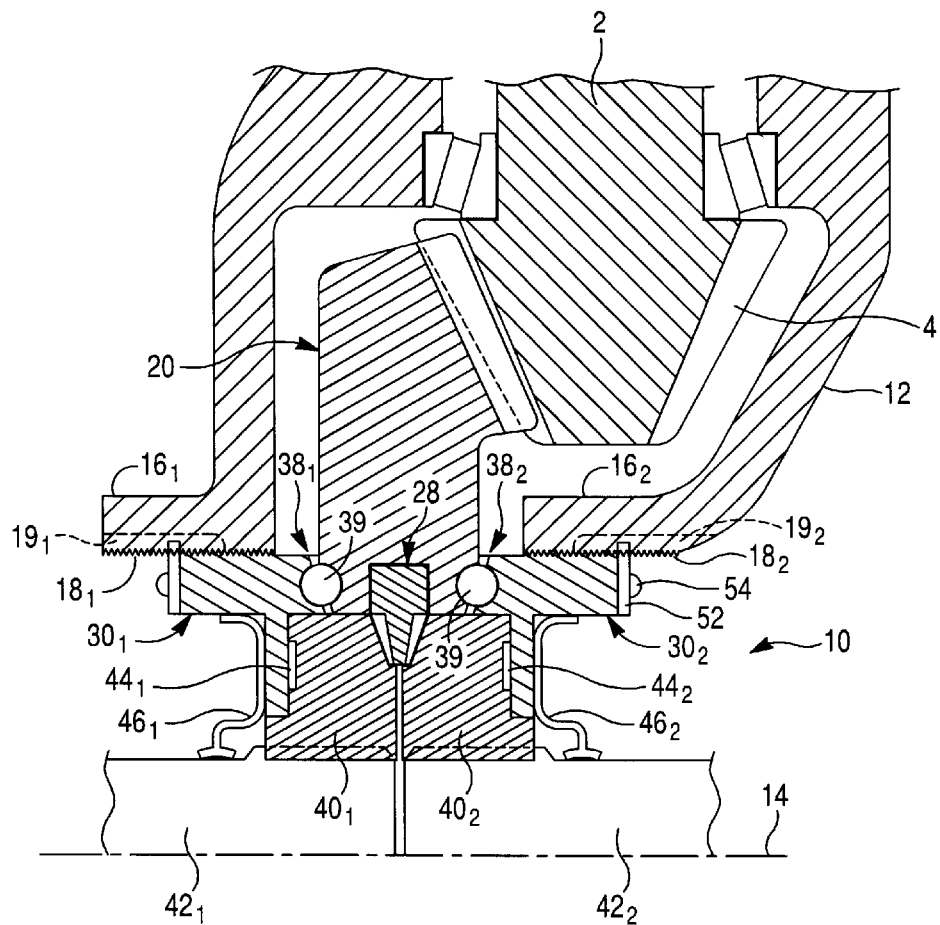
FIG. 1 is a partial sectional view of a differential assembly in accordance with the first embodiment of the present invention.

FIG. 1 of the drawings illustrates the first exemplary embodiment of a differential assembly generally indicated at 10, in accordance with the present invention. Reference numeral 12 defines a hollow differential housing rotatably supporting the differential assembly 10 for rotation about a central axis of rotation 14.

Figure 2:
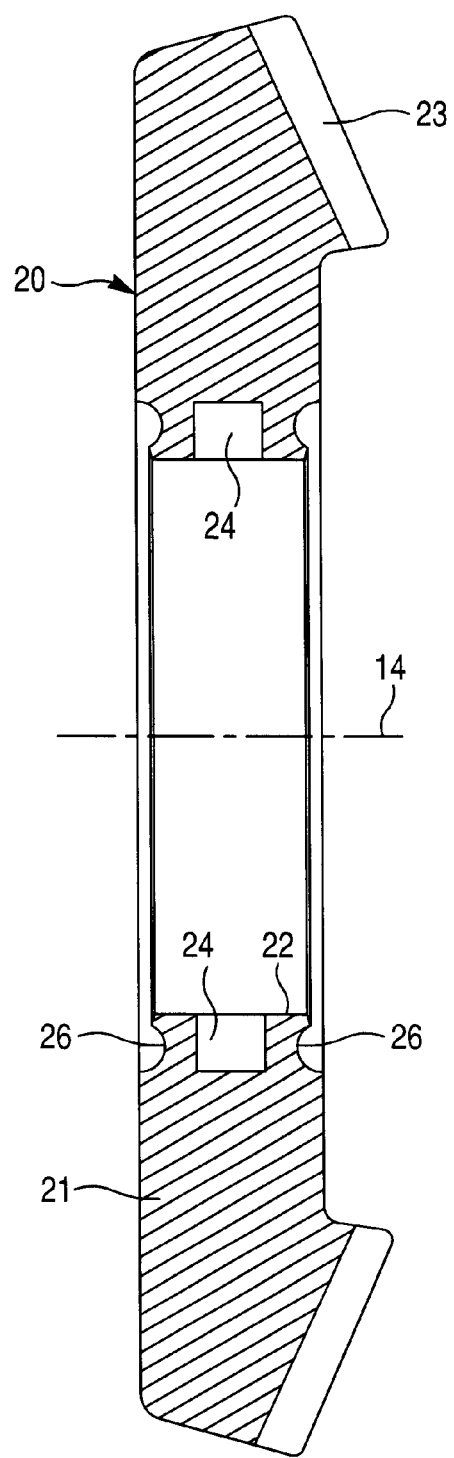
FIG. 2 is a cross-sectional view of a ring gear in accordance with the first embodiment of the present invention.

The differential housing 12, illustrated in detail in FIG. 2, includes a pair of opposite, substantially tubular hub portions 16, and 16₂ coaxial with the central axis 14. Each of the hub portions 16, or 16₂ has a threaded, substantially cylindrical bores $18_1$ or $18_2$, respectively.

A ring gear 20 is adjustably and rotatably supported within the differential housing 12 between a pair of opposite ring gear adjusting members $30_1$ and $30_2$ coaxial with the central axis 14 via anti-friction bearing assemblies $38_1$ and $38_2$. The ring gear adjusting members $30_1$ and $30_2$ define a ring gear adjustment device. Each of the bearing assemblies $38_1$ or $38_2$ is disposed between the ring gear 20 and the corresponding adjusting members $30_1$ or $30_2$.

The ring gear 20 illustrated in detail in FIG. 2, includes a substantially flat body 21 having opposite, substantially flat face surfaces $25_1$ and $25_2$, a substantially cylindrical central bore 22 coaxial with the central axis 14, and a plurality of gear teeth 23 integrally formed on an outer peripheral surface thereof. Driving torque is transmitted to the differential assembly 10 from a vehicular driveshaft (not shown) by means of a drive pinion shaft 2 provided with an integral pinion gear 4 in continuous meshing engagement with the gear teeth 23 of the ring gear 20.

Preferably, the adjusting members $30_1$ and $30_2$ are substantially identical. Each of the adjusting members $30_1$ and $30_2$ (only the adjusting member $30_1$ is illustrated in detail in FIG. 3) includes a substantially cylindrical body 31 having a threaded, substantially cylindrical outer peripheral surface 32 complementary to the threaded surfaces of the bores $18_1$ and $18_2$, respectively, of the hub portions $16_1$ and $16_2$ of the differential housing 12, and an inner face surface 33. The adjusting members $30_1$ and $30_2$ are adapted to be mounted within the hub portions $16_1$ and $16_2$ of the differential housing 12 by threadedly engaging the threaded surfaces 32 thereof with the threaded surfaces of the bores $18_1$ and $18_2$ of the hub portions $16_1$ and $16_2$ of the differential housing 12.

As illustrated in FIG. 1, the bearing assemblies $38_1$ or $38_2$ are disposed between the face surfaces $25_1$ and $25_2$ of the ring gear 20 and the corresponding inner face surfaces 33 of the adjusting members $30_1$ or $30_2$. It will be appreciated by those skilled in the art that by selectively rotating the adjusting members $30_1$ and $30_2$, position of the ring gear 20 relative to the differential housing 12 and preload of the bearing assemblies $38_1$ or $38_2$ may be appropriately adjusted.

Figure 3:
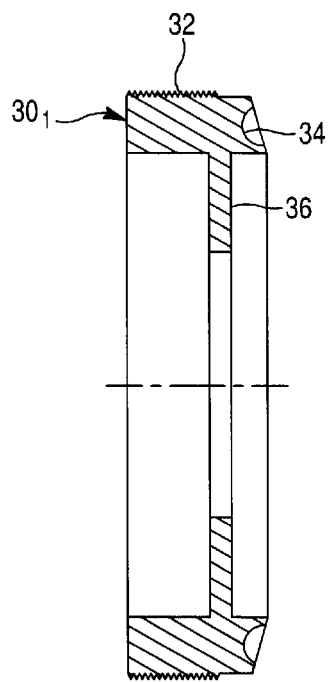
FIG. 3 is a sectional view of an adjusting ring in accordance with the first embodiment of the present invention.

Preferably, the bearing assemblies $38_1$ or $38_2$ are substantially identical. Each of them comprises a rotatable inner bearing race 26, a non-rotatable or fixed outer bearing race 34, and a plurality of rolling elements 39. Preferably, the bearing assemblies $38_1$ or $38_2$ are ball bearings including the inner bearing races 26 integrally formed on the face surfaces $25_1$ and $25_2$ of the ring gear 20 as illustrated in FIG. 2, the outer bearing races 34 integrally formed on the inner face surfaces 33 of the adjusting members $30_1$ and $30_2$ as illustrated in FIG. 3, and plurality of the ball-shaped rolling elements 39. Alternatively, the anti-friction bearing assemblies $38_1$ and $38_2$ may be in the form of roller bearings well known to those skilled in the art. Thus, by selectively rotating the adjusting members $30_1$ and $30_2$, position of the ring gear 20 relative to the differential housing 12 and bearing preload of the bearing assemblies $38_1$ or $38_2$ may be appropriately adjusted.

Moreover, in order to lock the adjustment members $30_1$ or $30_2$ in place, suitable locking devices $50_1$ and $50_2$, well known in the art, may be used. In the exemplary embodiment shown in FIG. 1, each of the locking devices $50_1$ and $50_2$ includes a toothed locking plate 52 engaging grooves $19_1$ or $19_2$ formed in the inner peripheral surfaces of the bores $18_1$ or $18_2$ of the hub portions $16_1$ or $16_2$ of the differential housing 12, and rigidly secured to the adjusting member $30_1$ or $30_2$ by means of a bolt 54 engaging a corresponding threaded bore in the adjusting member $30_1$ or $30_2$. In this manner, the adjusting members $30_1$ or $30_2$ may be adjusted in a stepwise manner and, when appropriate adjustment is achieved, the locking plate 52 is applied and fixed in position by the bolt 54, keeping the adjusting members $30_1$ or $30_2$ from becoming misadjusted during a long-extended service life. It will be appreciated that the other appropriate locking devices may be provided.

The differential assembly 10 further comprises a set of pinion mate gears 28 rotatably supported in a free-floating manner to the ring gear 20. Preferably, the differential assembly 10 includes at least four pinion mate gears 28. However, any other appropriate number of the pinion mate gears, such as two, three, five, etc., is within the scope of the present invention.

Figure 4:
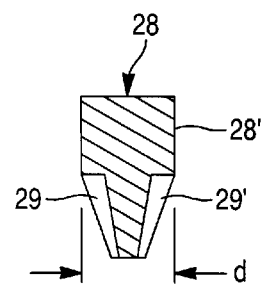
FIG. 4 is a sectional view of a pinion mate gear in accordance with the present invention.

Each of the pinion mate gears 28, illustrated in detail in FIG. 4, includes an integral, substantially cylindrical shaft section 28' and a plurality of gear teeth 29'. Preferably, as illustrated in FIG. 4, the gear teeth 29' are formed on an inboard end 29 of the shaft section 28' within an outside diameter do thereof as a unitary single-piece part.

In turn, the ring gear 20, as illustrated in detail in FIG. 2, is provided with a corresponding number of complementary, angularly spaced, substantially cylindrical recesses 24 formed on an inner peripheral surface 25 of the ring gear 20. As clearly illustrated in FIG. 1, the shaft sections 28' of the pinion mate gears 28 are adapted to be rotatably mounted in a free-floating manner in the complementary recesses 24 in the inner peripheral surface 25 of the ring gear 20. Thus, the pinion mate gears 28 are rotatably retained in the ring gear 20 and drivingly engage the ring gear 20 for rotation therewith about the central axis 14.

The pinion mate gears 28 are in constant mesh with side gears 40, and 402 that are, in turn, drivingly coupled to a pair of oppositely extending axle shafts $42_1$ and $42_2$, as illustrated in FIG. 1. The axle shafts $42_1$ and $42_2$ are extending from the differential housing 12 coaxially to the central axis 14, and are adapted to rotate thereabout.

The side gears $40_1$ and $40_2$ are retained in an axial direction of the central axis 14 by retaining flanges 36 integrally formed on the adjusting members $30_1$ and $30_2$ as illustrated in FIGS. 1 and 3. Thrust bearings in the form of needle bearings $44_1$ and $44_2$ are provided between the side gears $40_1$ and $40_2$ and the corresponding retaining flanges 36 of the adjusting members $30_1$ and $30_2$. It will be appreciated that any other appropriate types of the thrust bearings are within the scope of the present invention.

Moreover, the differential assembly 10 of the present invention includes a pair of opposite rotary seal members $46_1$ and $46_2$ secured to the corresponding adjusting members $30_1$ and $30_2$ as illustrated in FIG. 1.

Figure 5:
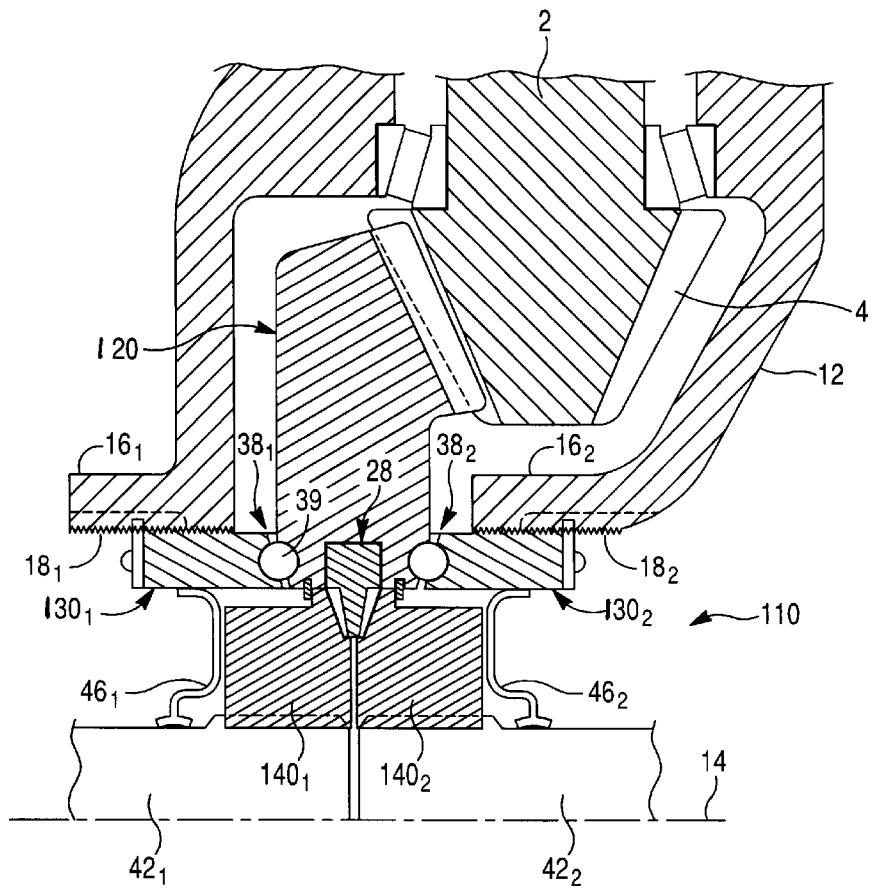
FIG. 5 is a partial sectional view of a differential assembly in accordance with the second embodiment of the present invention.
Figure 6:
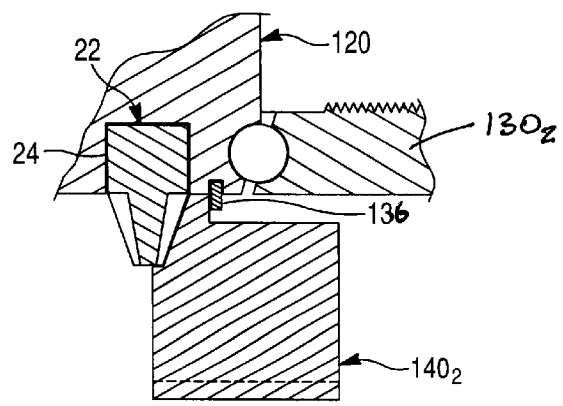
FIG. 6 is an enlarged sectional view of a side gear retention arrangement in accordance with the second embodiment of the present invention.
Figure 7:
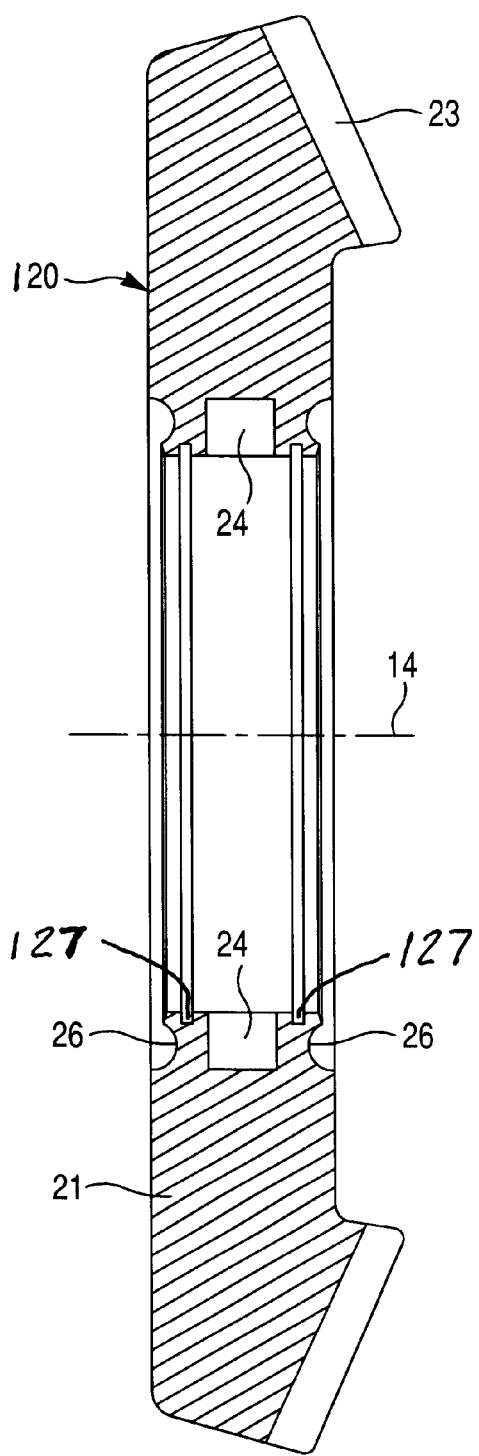
FIG. 7 is a cross-sectional view of a ring gear in accordance with the second embodiment of the present invention.

FIGS. 5–7 of the drawings illustrates a second exemplary embodiment of a differential assembly in accordance with the present invention, generally indicated at 110. Components, which are unchanged from, or function in the same way as in the exemplary embodiment depicted in FIGS. 1–4 are labeled with the same reference numerals. The differential assembly of FIG. 5 corresponds substantially to the differential assembly of FIG. 1, and only the side gear retention arrangement, which differs, will therefore be explained in detail below.

As illustrated in FIGS. 5 and 6, side gears $140_1$ and $140_2$ are respectively limited in their axially outward movement by radially inwardly protruding retaining rings 136, thus eliminating the need for the gear retaining flanges 36 formed on the adjusting members $30_1$ and $30_2$ as illustrated in FIGS.

1 and 3. The retaining rings 136 are preferably in the form of slotted snap rings fitted within annular recesses 127 formed on a substantially cylindrical central bore 122 of a ring gear 120, as shown in detail in FIG. 7.

Therefore, the compact differential assembly in accordance with the present invention represents a novel arrangement of the differential assembly that is simple, adjustable, exceptionally narrow, inexpensive in manufacturing and easy to assemble.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A differential assembly comprising:
   a ring gear rotatably supported within a differential housing about a central axis;
   a set of pinion mate gears rotatably mounted to said ring gear;
   a pair of opposite side gears drivingly engaging said differential pinion mate gears for establishing driving connection between said ring gear and said side gears and allowing differential rotation between said side gears; and
   an adjustment device for selectively adjusting position of said ring gear relative to said differential housings
   wherein said adjustment device includes a pair of adjusting members selectively positionable within said differential housing coaxially to said central axis on opposite sides of said ring gear, and
   wherein said ring gear is rotatably supported within said differential housing by said adjusting members.

2. The differential assembly as defined in claim 1, wherein each of said pinion mate gears is mounted to said ring gear in a free-floating manner.

3. The differential assembly as defined in claim 1, wherein each of said pinion mate gears has a shaft section drivingly engaging said ring gear in a free-floating manner.

4. The differential assembly as defined in claim 3, wherein said ring gear includes a substantially cylindrical central bore provided with a plurality of substantially cylindrical recesses receiving said shaft sections of said pinion mate gears.

5. The differential assembly as defined in claim 3, wherein each of said pinion mate gears has a plurality of gear teeth integrally formed at an inboard end of said shaft section within an outside diameter thereof.

6. The differential assembly as defined in claim 1, wherein said differential housing is provided with a pair of opposite coaxial internally threaded bores, and each said adjusting members includes a substantially cylindrical threaded outer peripheral surface engaging with corresponding one of said internally threaded bores for selectively axially positioning said adjusting members within said threaded bores in said differential housing.

7. The differential assembly as defined in claim 1, further including two anti-friction bearing assemblies each disposed between said ring gear and one of said adjusting members for rotatably supporting said ring gear within said differential housing, said adjusting members provided for selectively adjusting position of said ring gear relative to said differential housing and preloading said bearing assemblies.

8. The differential assembly as defined in claim 7, wherein each of said anti-friction bearing assemblies includes an inner race engaging one of opposite face surfaces of said ring gear, an outer race engaging an inner face surface of one of said adjusting members and a plurality of rolling elements disposed therebetween.

9. The differential assembly as defined in claim 8, wherein said differential housing is provided with a pair of opposite coaxial internally threaded bores, and each said adjusting members includes a substantially cylindrical threaded outer peripheral surface engaging with corresponding one of said internally threaded bores for selectively axially positioning said adjusting members within said threaded bores in said differential housing for preloading said bearing assemblies.

10. The differential assembly as defined in claim 8, wherein said inner race of each of said bearing assemblies is integrally formed on one of said face surfaces of said ring gear, and said outer race of each of said bearing assemblies is integrally formed on said inner face surface of one of said adjusting members.

11. The differential assembly as defined in claim 8, wherein said rolling elements are in the form of spherical balls.

12. The differential assembly as defined in claim 1, wherein at least one of said adjusting members further includes a radially inwardly protruding retaining flange provided for limiting axial outward movement of corresponding one of said side gears.

13. The differential assembly as defined in claim 12, wherein said at least one of said adjusting members is integrally formed with said retaining flange as a unitary single-piece part.

14. The differential assembly as defined in claim 1, further including at least one radially inwardly protruding retaining ring fitted within an annular recess formed on a substantially cylindrical central bore of said ring gear for limiting axial outward movement of corresponding one of said side gears.

15. The differential assembly as defined in claim 12, further including at least one thrust bearing disposed between at least one of said side gears and said retaining flange of at least one of said adjusting members.

16. The differential assembly as defined in claim 15, wherein said thrust bearing is a needle bearing.

17. A differential assembly comprising:
   a differential housing provided with a pair of opposite coaxial internally threaded bores;
   a ring gear rotatable within said differential housing about a central axis, said ring gear including a substantially cylindrical central bore provided with a plurality of substantially cylindrical recesses and a pair of opposite face surfaces;
   a set of pinion mate gears rotatably mounted to said ring gear, each of said pinion mate gears has a shaft section drivingly engaging one of said cylindrical recesses in said ring gear in a free-floating manner and a plurality of gear teeth integrally formed at an inboard end of said shaft section within an outside diameter thereof;

pair of opposite side gears drivingly engaging said differential pinion mate gears for establishing driving connection between said ring gear and said side gears and allowing differential rotation between said side gears;

a pair of adjusting members selectively positionable within said differential housing coaxially to said central axis on opposite sides of said ring gear, each of said adjusting members including a substantially cylindrical threaded outer peripheral surface engaging with corresponding one of said internally threaded bores of said differential housing and a radially inwardly protruding retaining flange provided for limiting axial outward movement of corresponding one of said side gears;

a pair of ball bearing assemblies each disposed between one of said face surfaces of said ring gear and one of said adjusting members for rotatably supporting said ring gear within said differential housing, each of said bearing assemblies including an inner race integrally formed on one of said face surfaces of said ring gear, an outer race integrally formed on an inner face surface of one of said adjusting members and a plurality of spherical rolling elements; and a pair of thrust bearings each disposed between one of said side gears and said retaining flange one of said adjusting members;

wherein said pair of adjusting members is provided for selectively adjusting position of said ring gear relative to said differential housing and for preloading said ball bearing assemblies.

18. A differential assembly comprising:

a differential housing provided with a pair of opposite coaxial internally threaded bores;

a ring gear rotatable within said differential housing about a central axis, said ring gear including a substantially cylindrical central bore provided with a plurality of substantially cylindrical recesses and a pair of opposite face surfaces;

a set of pinion mate gears rotatably mounted to said ring gear, each of said pinion mate gears has a shaft section drivingly engaging one of said cylindrical recesses in said ring gear in a free-floating manner and a plurality of gear teeth integrally formed at an inboard end of said shaft section within an outside diameter thereof;

a pair of opposite side gears drivingly engaging said differential pinion mate gears for establishing driving connection between said ring gear and said side gears and allowing differential rotation between said side gears;

a pair of opposite radially inwardly protruding retaining rings fitted within complementary annular recesses formed on said substantially cylindrical central bore of said ring gear for limiting axial outward movement of said corresponding side gears;

a pair of adjusting members selectively positionable within said differential housing coaxially to said central axis on opposite sides of said ring gear, each of said adjusting members including a substantially cylindrical threaded outer peripheral surface engaging with corresponding one of said internally threaded bores of said differential housing; and a pair of ball bearing assemblies each disposed between one of said face surfaces of said ring gear and one of said adjustment members for rotatably supporting said ring gear within said differential housing, each of said bearing assemblies including an inner race integrally formed on one of said face surfaces of said ring gear, an outer race integrally formed on an inner face surface of one of said adjusting members and a plurality of spherical rolling elements;

wherein said pair of adjusting members is provided for selectively adjusting position of said ring gear relative to said differential housing and for preloading said ball bearing assemblies.

19. A differential assembly comprising:

a ring gear rotatably supported within a differential housing about a central axis;

a set of pinion mate gears rotatably mounted to said ring gear;

a pair of opposite side gears drivingly engaging said differential pinion mate gears for establishing driving connection between said ring gear and said side gears and allowing differential rotation between said side gears; and an adjustment device for selectively adjusting position of said ring gear relative to said differential housing, wherein each of said pinion mate gears has a shaft section drivingly engaging said ring gear in a free-floating manner.

20. A differential assembly comprising:

a ring gear rotatably supported within a differential housing about a central axis;

a set of pinion mate gears rotatably mounted to said ring gear;

a pair of opposite side gears drivingly engaging said differential pinion mate gears for establishing driving connection between said ring gear and said side gears and allowing differential rotation between said side gears; and an adjustment device for selectively adjusting position of said ring gear relative to said differential housing, wherein said adjustment device includes a pair of adjusting members selectively positionable within said differential housing coaxially to said central axis on opposite sides of said ring gear, and wherein said differential housing is provided with a pair of opposite coaxial internally threaded bores, and each said adjusting members includes a substantially cylindrical threaded outer peripheral surface engaging with corresponding one of said internally threaded bores for selectively axially positioning said adjusting members within said threaded bores in said differential housing.

* * * * *